US012056806B2

(12) United States Patent
Raposo Subtil et al.

(10) Patent No.: US 12,056,806 B2
(45) Date of Patent: *Aug. 6, 2024

(54) FINE GRAINED INTERLEAVED RENDERING APPLICATIONS IN PATH TRACING FOR CLOUD COMPUTING ENVIRONMENTS

(71) Applicant: NVIDIA Corporation, Santa Clara, CA (US)

(72) Inventors: Nuno Raposo Subtil, San Jose, CA (US); Manuel Kraemer, San Jose, CA (US); Alexey Panteleev, Los Gatos, CA (US); Mike Songy, Scotts Valley, CA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/662,516

(22) Filed: May 9, 2022

(65) Prior Publication Data

US 2022/0262062 A1    Aug. 18, 2022

Related U.S. Application Data

(63) Continuation of application No. 16/945,427, filed on Jul. 31, 2020, now Pat. No. 11,328,471, which is a (Continued)

(51) Int. Cl.
*G06T 15/06*    (2011.01)
*G06T 1/20*    (2006.01)
(Continued)

(52) U.S. Cl.
CPC ............... *G06T 15/06* (2013.01); *G06T 1/20* (2013.01); *G06T 5/20* (2013.01); *G06T 5/50* (2013.01);
(Continued)

(58) Field of Classification Search
CPC .. G06T 15/06; G06T 1/20; G06T 5/20; G06T 5/50; G06T 2207/20221; G06T 2210/08;
(Continued)

(56) References Cited

U.S. PATENT DOCUMENTS

| | | | | |
|---|---|---|---|---|
| 2014/0187331 A1* | 7/2014 | Kim | ......................... | A63F 13/12 |
| | | | | 375/240.07 |
| 2014/0347359 A1* | 11/2014 | Gruen | ................... | G06T 15/503 |
| | | | | 345/426 |
| 2019/0370926 A1* | 12/2019 | Hagland | ................. | G06F 3/012 |

OTHER PUBLICATIONS

Bugeja et al., "An asynchronous method for cloud-based rendering", Jul. 16, 2018 (Year: 2018).*

(Continued)

*Primary Examiner* — Yingchun He

(74) *Attorney, Agent, or Firm* — Taylor English Duma L.L.P.

(57) ABSTRACT

Systems and methods of the present disclosure relate to fine grained interleaved rendering applications in path tracing for cloud computing environments. For example, a renderer and a rendering process may be employed for ray or path tracing and image-space filtering that interleaves the pixels of a frame into partial image fields and corresponding reduced-resolution images that are individually processed in parallel. Parallelization techniques described herein may allow for high quality rendered frames in less time, thereby reducing latency (or lag, in gaming applications) in high performance applications.

20 Claims, 11 Drawing Sheets

Related U.S. Application Data continuation-in-part of application No. 16/881,333, filed on May 22, 2020, now Pat. No. 11,270,496.

(60) Provisional application No. 62/852,917, filed on May 24, 2019.

(51) Int. Cl.
*G06T 5/20* (2006.01)
*G06T 5/50* (2006.01)
*H04L 67/10* (2022.01)

(52) U.S. Cl.
CPC .... *H04L 67/10* (2013.01); *G06T 2207/20221* (2013.01); *G06T 2210/08* (2013.01); *G06T 2210/52* (2013.01); *G06T 2210/61* (2013.01)

(58) Field of Classification Search
CPC . G06T 2210/52; G06T 2210/61; H04L 67/10; H04L 67/131
See application file for complete search history.

(56) References Cited

OTHER PUBLICATIONS

Segovia et al. "Non-interleaved Deferred Shading of Interleaved Sample Patterns", Graphics Hardware 2006 (Year: 2006).*
Ishmukhametov Efficient Tile-Based Deferred Shading Pipeline, Thesis 2013 (Year: 2013).*
Hahn "Global Illumination Optimization: Integrating Interleaved Sampling into Reflective Shadow Maps and Splatting Indirect Illumination", MS Thesis, Summer 2012 (Year: 2012).*

* cited by examiner

FINE GRAINED INTERLEAVED RENDERING APPLICATIONS IN PATH TRACING FOR CLOUD COMPUTING ENVIRONMENTS

CROSS-REFERENCE TO RELATED APPLICATION

This application is a continuation of U.S. patent application Ser. No. 16/945,427, filed on Jul. 31, 2020, which itself is a continuation-in-part of U.S. Non-provisional application Ser. No. 16/881,333, filed on May 22, 2020, which claims the benefit of U.S. Provisional Application No. 62/852,917, filed on May 24, 2019, each of which are incorporated by reference in their entirety.

TECHNICAL FIELD

This application is directed, in general, to rendering and, more specifically, to rendering an image using ray tracing.

BACKGROUND

Many computer graphic images are created by generating a two-dimensional (2D) image of a three-dimensional (3D) scene from a given viewpoint. This process, called "rendering," typically includes using mathematical models of the scene, which may include information on geometry, lighting, shading, physics, motion, and texture information. As the demand for computer graphics, and in particular the demand for real-time computer graphics, has increased, computer systems adapted to accelerate the rendering process have become widespread. In such systems, an application running on a central processing unit (CPU) performs high-level operations, such as determining the position, motion, and collision of objects and particles in a given scene. From these high-level operations, the application, such as a video game, generates a set of rendering commands and data defining the desired rendered image or scene. For example, rendering commands and data can define scene geometry, lighting, shading, texturing, motion, and/or camera parameters for a scene. A graphics processing system employing graphics processing units (GPUs) then creates one or more rendered scenes from the set of rendering commands and data.

Some conventional approaches use rasterization in a pipeline for rendering scenes. However, rasterization cannot be efficiently parallelized at pixel-coarse granularity. Other conventional approaches have implemented ray tracing for rendering pipelines because parallelization of the ray tracing processes can be done in a more fine-grained manner compared to rasterization. After the ray tracing portion of the pipeline, however, image-space filtering is typically needed that requires all of a frame's data be available for the entire rendered image in order to produce desired results. Such image-space filtering combines information about pixels in a close proximity on the image, which may require, for example, access to several input pixels distributed within a 50-pixel radius around every output pixel. Some well-known parallelization techniques are based on splitting the frame into large parts or tiles, and such splitting makes some input pixels inaccessible to the image-space filters unless the entire frame is combined on one processor before running the filter. As a result, the size of the frame data that needs to be transferred across all the contributing processors for this image-space filtering can easily exceed the available bandwidth, which then considerably degrades performance—thereby reducing some of the benefits realized by parallelization.

SUMMARY

Systems and methods of the present disclosure relate to fine grained interleaved rendering applications in path tracing for cloud computing environments. For example, a renderer and a rendering process may be employed for ray or path tracing and image-space filtering that interleaves the pixels of a frame into partial image fields and corresponding reduced-resolution images that are individually processed in parallel. The parallel processing can be performed by a single processor or by multiple processors—such as different graphics processing units (GPUs)—and is applicable to both local and remote computing. As such, the disclosed rendering can be performed by a cloud-based renderer that provides rendered frames for remote users.

For example, frames may be rendered by a renderer executing on one or more GPUs, virtual GPUs, and/or other processors of one or more servers in a cloud environment—e.g., as hosted by a data center(s). As such, the parallelization techniques described herein may allow for high quality rendered frames in less time, thereby reducing latency (or lag, in gaming applications) in high performance applications. In cloud application environments, where latency greater than 20-40 milliseconds—depending on the application—may impact the quality of the application experience, reducing rendering times may aid in satisfying latency requirements. As an example, in a cloud gaming system, users may desire a rendered frame quality that is on par with or better than locally hosted game applications using high performing game consoles or personal computers (PCs). As a result, the ray or path tracing techniques described herein may not only allow for rendered video streams received from the cloud to meet or exceed the quality expectations of users, but may also provide the high quality frames to the users at an acceptable latency. As such, when a user provides an input to their device, this input data may be transmitted to the cloud host, used to render updated frames according to the ray or path tracing techniques described herein, and then streamed to the device of the user at a high quality and with low latency.

BRIEF DESCRIPTION OF THE DRAWINGS

Reference is now made to the following descriptions taken in conjunction with the accompanying drawings, in which.

DETAILED DESCRIPTION

Systems and methods are disclosed related to fine grained interleaved rendering in path tracing applications for cloud computing environments. For example, to decrease latency while also improving rendering quality, ray or path tracing techniques may be parallelized in such a way that bandwidth and data transmission requirements are reduced as compared to conventional systems. As a result, overall latency may be reduced, which may be increasingly valuable in high performance, high fidelity cloud applications—such as cloud gaming, cloud virtual reality (VR) and/or augmented reality (AR), remote desktop, simulation applications (e.g., vehicle simulation applications, robotics simulation applications, etc.), and/or other application types. As used herein, in parallel may include processing at least partially in parallel and may indicate that processing is occurring in parallel paths but not necessarily simultaneously at any one time, or all times.

For example, ray or path tracing is an example of a technique used for rendering scenes in a rendering pipeline; especially when the scenes include complex lighting. Ray tracing describes any number of techniques used for efficiently resolving visibility along a straight line between any two arbitrary points in a scene, where the visibility information is used to resolve light transport and light interactions with materials in the scene. For example, ray tracing can extend a line, e.g., a ray, from a user's view perspective to an object within the scene, and then determine a second ray from that object to a light source or to another object of the scene. These rays can then be used to determine the amount of light hitting the objects (including indirect lighting and reflections), the angle of the light to the user's view perspective, and how the color, texture, and other object characteristics are represented to the user.

Parallelizing graphics workloads across multiple processors in a rendering pipeline can be used to increase rendering performance—e.g., to increase rendering quality and decrease runtime. This may be especially valuable in cloud streaming, as reducing latency in rendering aids in reducing the overall latency of a cloud-based system that already requires transmission of large streams of data over the Internet. For example, the transmission of the image and audio streams from a cloud data center over the Internet has some inherent latency associated therewith and, by decreasing rendering times using parallelization, the rendering process may contribute less to latency while still allowing for high fidelity ray traced or path traced graphics.

Figure 3A:
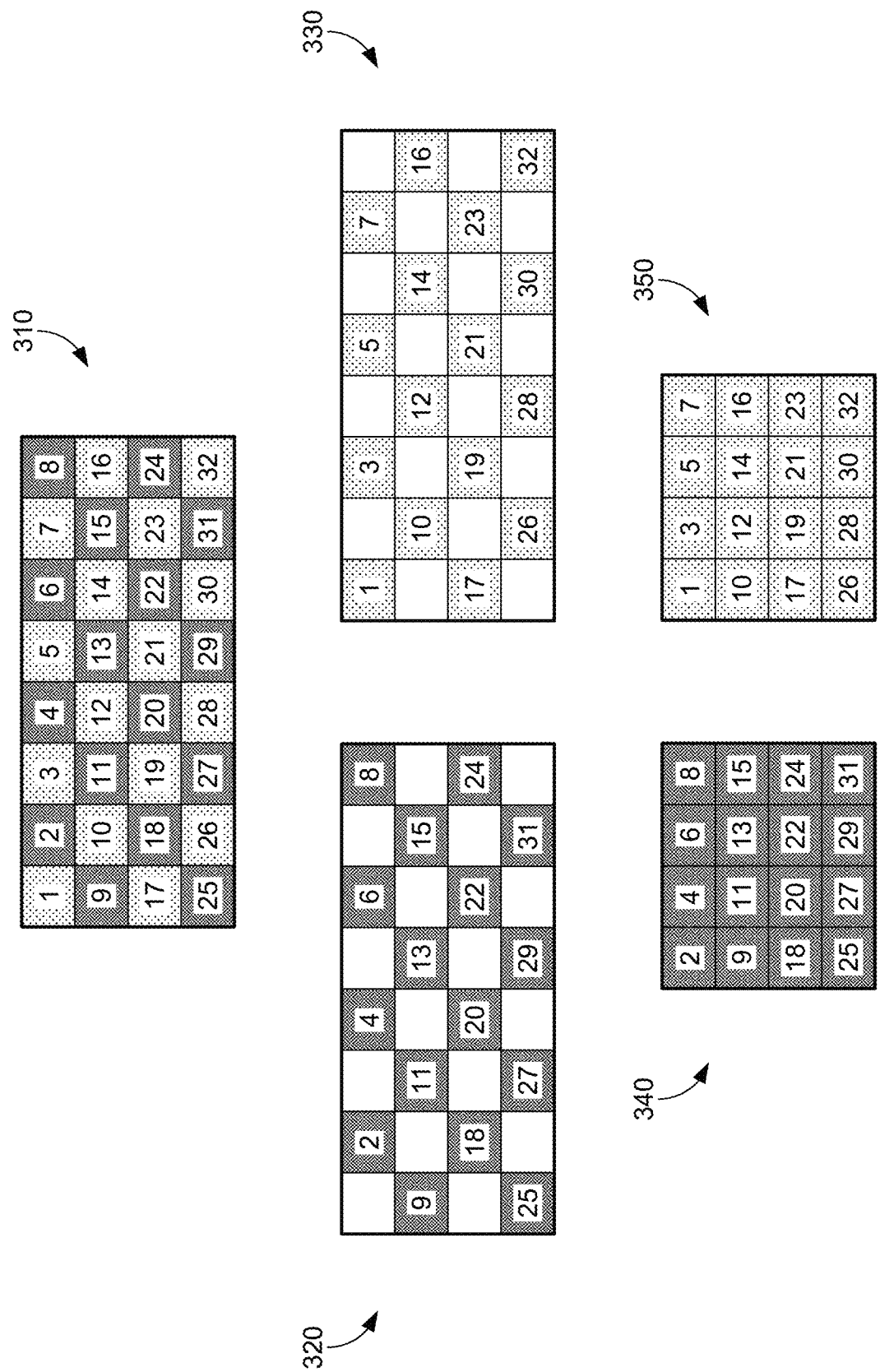
FIG. 3A illustrates examples of a full frame, partial image fields created from full frame data, and reduced-resolution images obtained by tracing rays through the partial image fields according to the principles of the disclosure.

The systems and methods of the present disclosure provide a renderer and a rendering process employing ray or path tracing and image-space filtering that interleaves the pixels of a frame into partial image fields and corresponding reduced-resolution images that are individually processed in parallel. The parallel processing can be performed by a single processor or by multiple processors—such as different graphics processing unit (GPU) resources, including different threads of a single GPU, one or more discrete GPUs, one or more virtual GPUs (vGPUs), etc.—and is applicable to both local and remote computing. As such, the disclosed rendering can be performed by a cloud-based renderer that provides rendered frames for remote users. The partial image fields can be created by separating the pixels of a frame into unique sets of interleaved pixels of the frame. The pixels of the frame can be separated into the unique interleaved sets to provide an even sampling of pixels across the full frame. For example, the pixels of each of the unique interleaved pixel sets are non-adjacent pixels of the full frame. As illustrated in FIG. 3A, the unique interleaved pixel sets of the different partial image fields can be sparse pixel grids of the full frame that include an even and odd field pattern of the pixels. When combined, all of the image fields make a full frame that includes pixel data for each position of the pixel grid of the frame.

Different processors of a graphics processing system can render reduced-resolution images by ray tracing the partial image fields. When employing two GPUs (e.g., discrete or virtual, such as part of a virtual machine), for example, each GPU can render alternate pixels (e.g., in each row or column) of the frame. The disclosed features can also be easily extended to systems with more GPUs available for parallel processing. For example, with four GPUs, a checkerboard pattern can be implemented by rendering every 4th pixel in a 2×2 pattern per GPU, instead of an even/odd field split. A single processor can also be used to independently render reduced-resolution images and perform image-space filtering on the reduced-resolution images in parallel. Image-space filtering can include, without limitation, applying post-process filters, such as neighborhood filters, and denoising operations or processes to rendered images.

As noted above, the approach disclosed herein allows for parallelization across the image-space filtering processes in addition to parallelization of the ray tracing processing themselves. This differs from prior techniques that have focused on either rasterization-based approaches, or parallelizing only the ray tracing portion of the rendering pipeline. At least one other advantage provided by the disclosure is that different rays can be traced through the different partial image fields to allow separation of path tracing workloads. For example when having two partial image fields, a reflection ray can be traced on one of the partial image fields of a frame and a refraction ray can be traced on the other one of the partial image fields of the frame. As such, shading of transmissive surfaces with both a reflective and refractive component (e.g., glass or water), can be done with only a single ray/light-path being traced for each pixel of the full frame. Other types of rays can be traced through additional partial image fields of the frame. For example, a third ray for a surface (e.g., dirty water) can be traced through yet another different partial image field of the frame having the glass and water. Using only a single ray (or a few rays) for ray tracing through each pixel of a frame is advantageous over current processes where, for example, reflections and refractions are normally processed either with several paths per pixel (e.g., offline path tracers) or perhaps with multiple denoisers that would process both reflected and refracted surfaces as separate channels. With the disclosed approaches, one set of full-resolution denoisers can be used to render high-quality reflections and refractions with, for example, effectively half the resolution on each effect with minimum modifications to the denoisers. A minimum modification can be setting a screen space boundary for the spatial filters.

Figure 1:
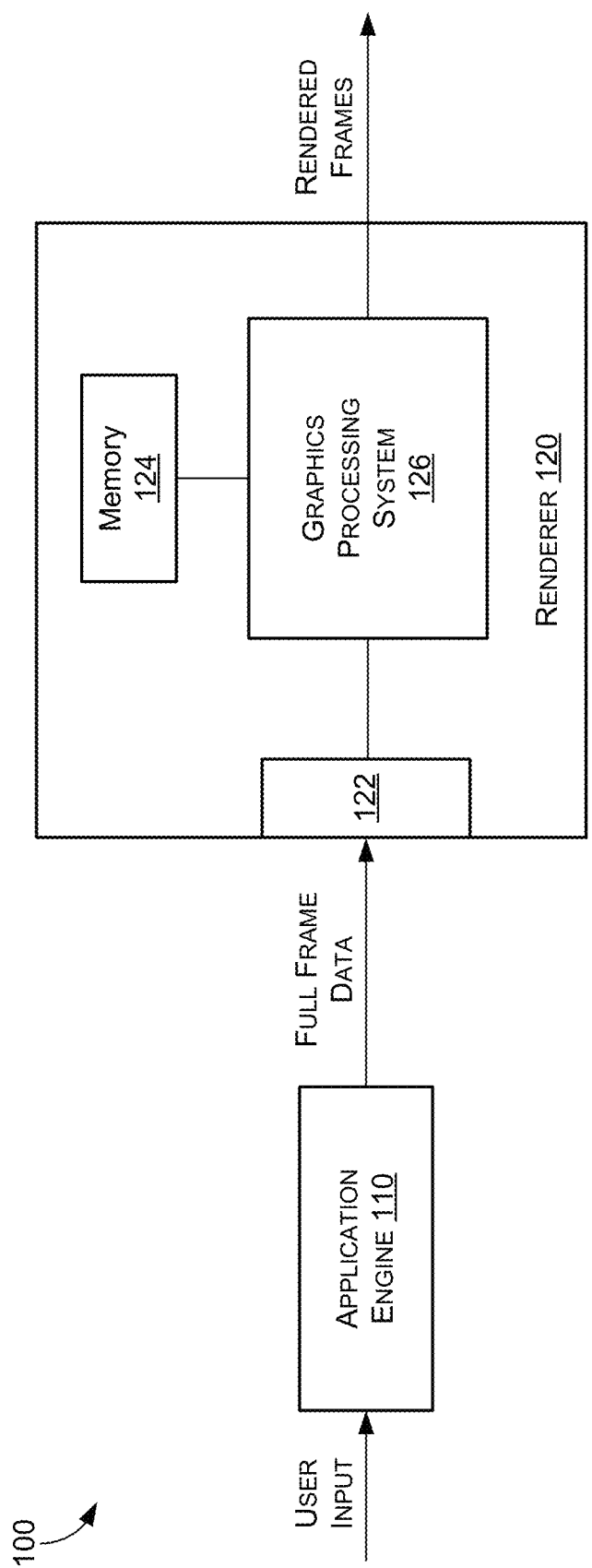
FIG. 1 illustrates a block diagram of an example of a computing system constructed according to the principles of the disclosure.

Now referring to FIG. 1, FIG. 1 illustrates a block diagram of an example of a computing system 100 constructed according to the principles of the disclosure. The computing system 100 is configured to render images from rendering commands and scene data. The rendered images provide scenes or frames of a scene that can be provided to a display for viewing. The computing system 100 includes an application engine 110 and a rendering engine or renderer 120. The computing system 100 can include additional components, such as an image processor that is configured to encode the rendered frames for video transmission over a communication system. The computing system 100, or at least a portion thereof, can be implemented on a single server or on multiple servers of a cloud computing platform, data center, or other server environment. For example, with respect to FIG. 8, the computing environment of FIG. 1 may correspond to a game streaming system 800, in some embodiments. With respect to FIG. 9, component, features, and/or functionality described herein with respect to the computing system 100 may include similar components, features, and/or functionality described with respect to example computing device 900 of FIG. 9. The computing system 100, or at least a portion thereof, can also be implemented on a user's computing device such as a desktop or laptop computer, in embodiments. In some applications the application engine 110 can be on a computing device that is communicatively coupled to the renderer 120 via a communications network. The communications network can be a conventional network, such as the Internet (or other wide area network (WAN)), a private network (e.g., a local area network (LAN)), or other type of network that allows the connected computing device to communicate with the renderer 120.

The application engine 110 includes the operating instructions that correspond to algorithms employed to generate scenes, such as a game engine providing scenes from a video game. The application engine 110 can be implemented on a processor, such as a CPU(s). An application or program stored on a non-transitory computer readable medium can include the operating instructions that direct the operation of a processor to generate a set of rendering commands and data defining the desired rendered scene. The rendering commands and data, collectively referred to as scene information, define scene geometry, lighting, shading, texturing, motion, and/or camera parameters for a frame. The application engine 110, in embodiments, can use inputs from a user to generate the scene information for a frame. The inputs can be from a client device, such as a game device. For example, as a user interacts with a cloud gaming application, a cloud VR and/or AR application, a remote desktop application, and/or the like, a stream of data corresponding to the inputs may be transmitted to the cloud server, and these inputs may be used to determine updates to the virtual scene or environment, that may then be reflected in the rendered frames. Once the frames are rendered—e.g., in view of the user's inputs—a stream of data corresponding to the rendered (and encoded, in embodiments) frames may be transmitted to the client device of the user for display. By streamlining the rendering process using the ray or path tracing techniques described herein, the high quality rendered frames may be received at the client device with low latency—thereby improving the application experience for the user.

The renderer 120 is configured to create one or more frames of rendered scenes from the set of scene information from the application engine 110. The renderer 120 includes an interface 122, a memory 124, and a graphics processing system 126. Each of the components of the renderer 120 can be communicatively coupled together via conventional connections. In some embodiments, the renderer 120 may be hosted by a cloud based system that may leverage any number of GPUs (e.g., discrete or virtual) and/or parallel processing units to execute rendering operations according to the ray or path tracing techniques described herein.

The interface 122 is configured to communicate, e.g., transmit and receive, data, such as receiving scene information from the application engine 110 for rendering full frames. As such, the interface 122 include the necessary circuitry, components, firmware, software, etc., to transmit and receive data. The interface 122 can be a conventional interface associated with processors that communicate data according to different protocols, such as industry or proprietary protocols used for communicating data between computing devices. The interface 122 can be configured to communicate via a communications network when remotely located from the application engine 110, such as when the renderer 120 is a cloud-based and server-based renderer. The communications network can be a conventional communications network that also communicates via standard protocols.

The memory 124 or data storage is a non-transitory computer readable medium configured to store a series of operating instructions that correspond to algorithms employed to render the scenes. The series of operating instructions, or computer code, direct the operation of a processor or processors of the graphics processing system 126 when initiated to perform the rendering, including rendering reduced-resolution images in parallel employing ray tracing and image-space filtering of the different reduced-resolution images in parallel. The memory 124 can also store additional data for the rendering, such as the received data from the application engine 110.

The graphics processing system 126 is configured to create partial image fields from pixels of the full frame data, render reduced-resolution images of the full frame by ray tracing the different partial image fields, perform image-space filtering on the reduced-resolution images, and merge the reduced-resolution images to provide a full rendered frame. The graphics processing system 126 includes the necessary logic to communicate with the interface 122 and the memory 124 and perform the functions described herein to render scenes. The graphics processing system 126 includes at least one processor, such as a GPU or a CPU, for processing the reduced-resolution images. With a single processor, such as a GPU, the single processor is configured to perform the rendering and image-space filtering in parallel and then merge the reduced-resolution images to provide the full frame. The graphics processing system 126 can include one or more GPUs for processing of the different partial image fields, wherein each GPU (or GPU resource) operates in parallel to provide the different reduced-resolution images and perform image-space filtering. The number of partial image fields can correspond to the number of GPUs (or virtual GPUs) available for processing the partial image fields in parallel. In different examples discussed herein, the number of partial image fields can be two, three, four, or more. The renderer 120 can also include additional components typically included in a renderer.

For rendering of the reduced-resolution images, the graphics processing system 126 traces a single light path through each of the different partial image fields for generating the reduced-resolution images. One light path can be for reflections and another light path can be for refractions. Additionally, the graphics processing system 126 is configured to independently apply image-space filters, such as neighborhood filters, and denoising operations on each of the reduced-resolution images after the ray tracing and before the reduced-resolution images are merged. Regardless if one or multiple processors are used, the image-space filtering can be independently applied to each of the reduced-resolution images in parallel. When using multiple GPUs, the image-space filtering can be done independently across the GPUs (or portions thereof, such as in a virtual GPU) without having full image data available. This reduces the amount of frame data that has to be communicated between the GPUs and therefore reduces the amount of bandwidth needed between the different GPUs. The graphics processing system 126 can include multiple processors, such as the graphics processing system of FIG. 2. For example, the graphics processing system 200 of FIG. 2 may be hosted by one or more servers in a data center hosting any number of instances of a cloud application—such as a cloud gaming application, a cloud VR and/or AR application, a remote desktop application, etc.

Figure 2:
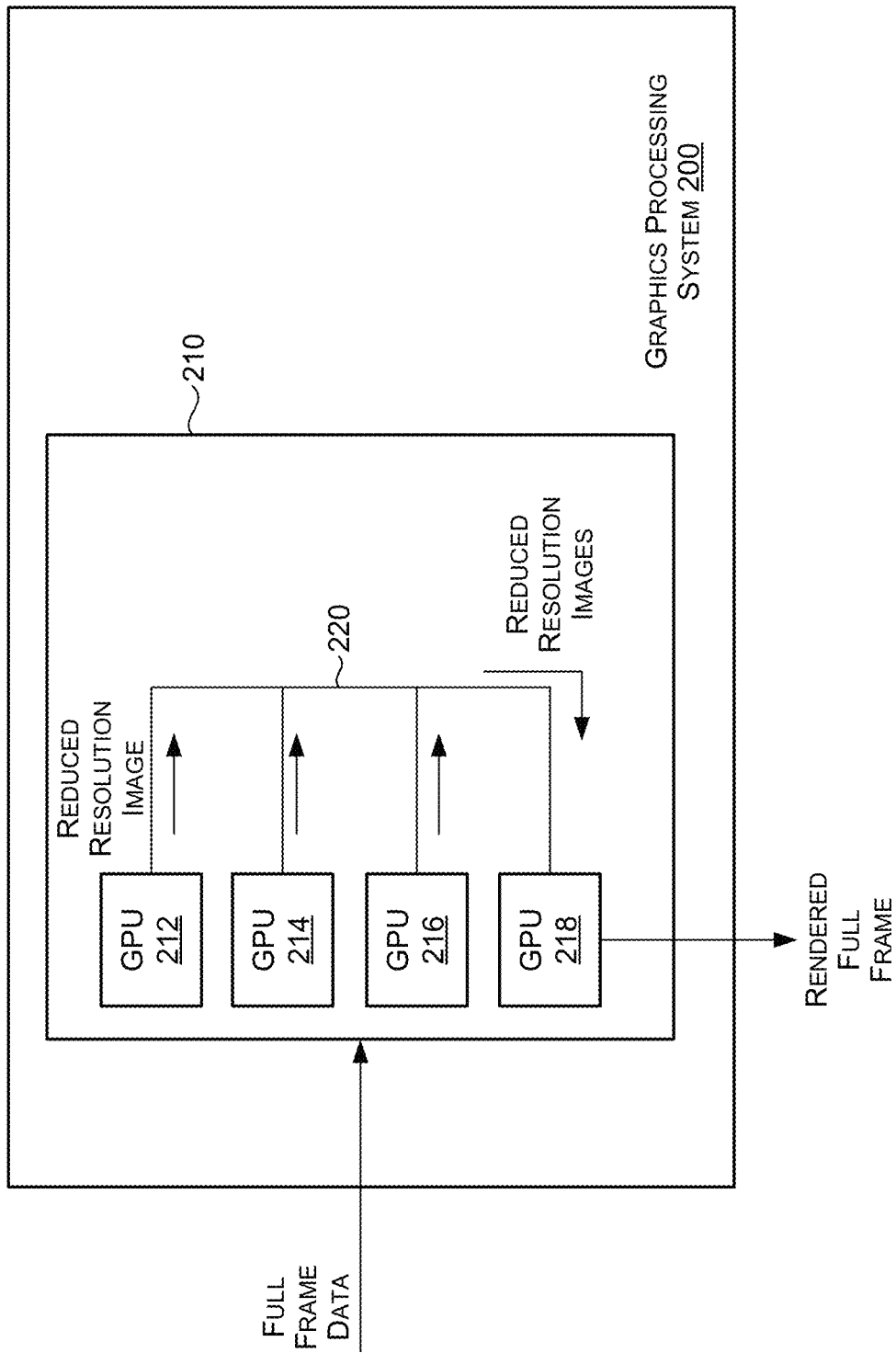
FIG. 2 illustrates a block diagram of an example of a graphics processing system constructed according to the principles of the disclosure.

With reference now to FIG. 2, FIG. 2 illustrates a block diagram of an example of a graphics processing system 200 constructed according to the principles of the disclosure. The graphics processing system 200 is configured to render reduced-resolution images of a full frame in parallel by ray tracing different partial image fields created from the full frame, perform image-space filtering on each of the reduced-resolution images in parallel, and merge the reduced-resolution images to provide a full rendered frame. The graphics processing system 200 includes multiple processors, collectively referred to as processors 210, coupled together via connectors 220. One of the processors 210, such as a GPU or a CPU, can be designated as a master device to perform the merging, such as interleaving, of the reduced-resolution images. A blur filter can be used for the merging. A combination of spatial and temporal filtering can also be used for the merging. The other ones of the processors 210 can send their reduced-resolution image to the master device for the merging over the connectors 220. Performing the image-space filtering on each of the different partial image fields reduces the data transfer that is needed over the connectors 220 between the processors 210. By transferring only the filtered interleaved images, the data transfer overhead is minimized when compared to existing parallelization techniques. As such, the bandwidth needed between the processors 210 can be reduced.

The connectors 220 can be conventional connections that are employed to communicatively couple multiple processors. The connectors 220 can be part of a communications interface configured to allow parallel operation of the multiple processors 210 in, for example, real-time ray tracing. The connectors 220 can be part of a scalable link interface (SLI) available from NVIDIA Corporation of Santa Clara, California.

In FIG. 2, the processors 210 include four GPUs that are individually denoted as GPU 212, GPU 214, GPU 216, and GPU 218. GPU 218 is denoted as the master device. With multiple GPUs, each of the multiple GPUs can be configured to render a reduced-resolution image in parallel. Additional image-space filtering, such as spatial filtering and denoising operations, can then be performed in parallel for the reduced-resolution images by the particular associated GPU. For example, GPU 212, GPU 214, GPU 216, and GPU 218 can each trace rays through a different partial image field of a frame to render a reduced-resolution image. GPU 212, GPU 214, GPU 216, and GPU 218 can then perform image-space filtering on the reduced-resolution images that each of the processors 210 rendered. The reduced-resolution image from GPU 212, GPU 214, and GPU 216 can then be sent to GPU 218 via the connectors 220 for merging with the reduced-resolution image rendered and image-space filtered by GPU 218. GPU 218 merges the four reduced-resolution images to generate the full rendered frame.

Though multiple processors 210 are used in FIG. 2, the split light-path rendering technique disclosed herein is also useful for single processor applications, where a single device processes the different partial image fields. The advantage with even employing a single device corresponds to improved image-space filtering, such as denoising results from continuous surfaces, given that only a single path is traced for each pixel of the full frame. As such, a single GPU can separate the pixels of a full frame into a unique set of interleaved pixels that are processed individually, and then merged to generate the full rendered frame. While FIG. 2 illustrates that four GPUs can be used in parallel, FIG. 3A provides an example of sparse pixel grids that can be employed with two processors. These are non-limiting examples and, as described herein, other number of GPUs or other processors (e.g., for executing parallel processing) may be implemented without departing from the scope of the present disclosure.

With reference to FIG. 3A, FIG. 3A illustrates examples of a full frame and two partial image fields created from full frame data according to the principles of the disclosure. The unique interleaved pixel sets can be processed in parallel and then merged, such as by a designated master device, to create a final rendered frame. FIG. 3A includes a full frame 310, a first partial image field 320 of the full frame 310, and a second partial image field 330 of the full frame 310. FIG. 3A further includes reduced-resolution images 340 and 350 that are created from the partial image fields 320 and 330. A processor of a graphics processing system can separate the pixels of the full frame 310 to generate the partial image fields 320 and 330. The partial image fields 320 and 330 can then be processed in parallel by one or more processors to render the reduced-resolution images 340 and 350. For example, GPU 212 can render reduced-resolution image 340 and GPU 218 can render reduced-resolution image 350.

The full frame 310 includes 32 pixels as indicated by the numbers. The odd numbered pixels and the even numbered pixels of the full frame 310 are also identified by different shading in FIG. 3A. The pixels of the full frame 310 are separated into the first and second partial image field 320, 330, that each include a unique set of interleaved pixels of the full frame 310. In this example, partial image field 320 includes the unique pixel set of the even numbered pixels and partial image field 330 includes the unit pixel set of the odd numbered pixels.

In one or more embodiments, the partial image fields 320, 330, are interleaved with spaces between the even or odd pixels that resemble a checkerboard. Such an embodiment is well-suited for systems with two parallel processing units, for example. According to other embodiments, the partial image fields 320, 330 may be interleaved according to other configurations, corresponding to a number of available parallel processing units within an integrated computing system. The partial image fields 320, 330, include an even representation of the pixels across the full frame 310. Creating the partial image fields 320, 330, allows separating the path tracing workloads of the full frame. For instance considering the even and odd pattern as illustrated in FIG. 3A, even pixels can be used to follow one light path (e.g. reflection) and odd pixels can be used to follow another one (e.g. refraction) to render the reduced-resolution images 340, 350. As a result, the two checkerboard fields can be denoised independently because the resulting reduced-resolution images 340, 350, are continuous that allows neighborhood spatial filters to see the same surface and effectively average lighting information across a continuous set of pixels. A direction of the light paths through the partial image fields 320, 330, can be based on the sample direction from the pixel index of the full frame 310.

Figure 3B:
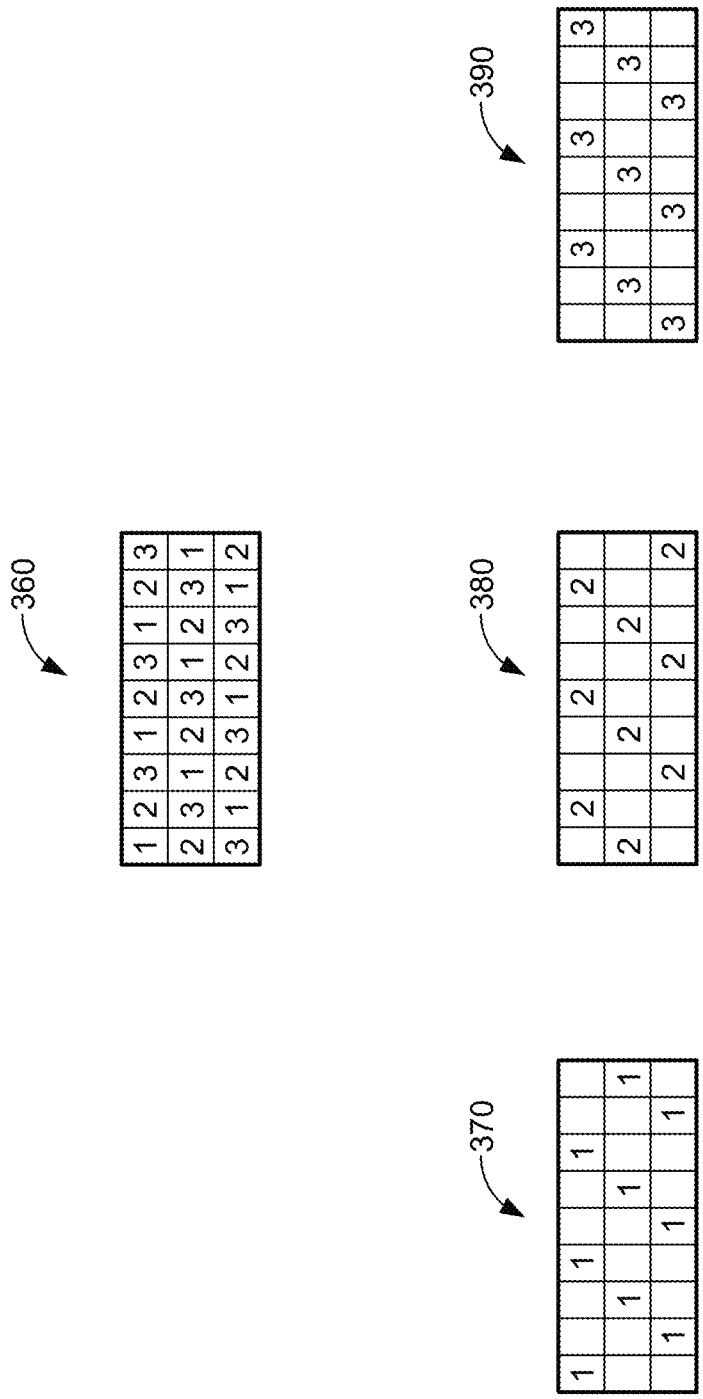
FIG. 3B illustrates an example of creating three image fields from the pixels of a full frame.

The reduced-resolution images 340, 350, are compressed such that the interleaved pixels of the partial image fields 320, 330, are contiguous. In this example, the partial image fields 320, 330, are compressed horizontally into dense half-frames to form the reduced-resolution images 340, 350, having a reduced resolution along one axis. In other examples, the partial image fields 320, 330, can be compressed vertically. The partial image fields 320, 330, can be compressed by removing the interleaved spaces. More than two partial image fields can be created from the pixels of the full frame 310. For example, every third or fourth pixel of the full frame 310 can be used to create three or four partial image fields and the resulting reduced-resolution images can be compressed along more than one axis. As an example, and with reference to FIG. 3B, FIG. 3B provides an example of creating three image fields from the pixels of a full frame 360. The pixels of the full frame 360 have been identified as first (1), second (2), and third (3) pixels. Partial image field 370 includes each of the first pixels, partial image field 380 includes each of the second pixels, and partial image field 390 includes each of the third pixels. Each of the partial image fields 370, 380, 390, can be compressed horizontally by removing the interleaved spaces to create reduced-resolution images.

Referring again to FIG. 3A, even though the pixels are not adjacent in the partial image fields 320, 330, the pixels are laid out contiguously in the image-space of the reduced-resolution images 340, 350. As such, image-space filtering, such as neighborhood filters and denoising operations, can be applied independently to each of the reduced-resolution images since each surface is a continuous image, albeit with a reduced resolution along at least one axis. With multiple GPUs, such as GPU 212 and 218, each GPU can apply the image-space filtering to their respective reduced-resolution image. For example, GPU 212 can process the reduced-resolution image 340 and GPU 218 can process the reduced-resolution image 350. Regardless of the number of GPUs employed, the interleaved output of each contributing GPU is merged in order to reconstruct the final, full resolution result, e.g., the full rendered frame. With multiple GPUs, one of the GPUs, such as GPU 218, can be designated as a master device that receives a copy of the reduced-resolution image(s) from the other GPU(s) that then merges the images to generate the full rendered frame. A filter can be used when merging the reduced-resolution images 340, 350, to reconstruct the full frame 310. For example, the checkerboard pattern can be discarded, and the half-frames can be re-interleaved into the final rendered image with a simple cross-shaped blur filter. A Fresnel factor or other surface parameters can be used for scaling the blending of the reduced-resolution images 340, 350.

Merging the reduced-resolution images 340, 350, can vary depending on the complexity of a scene. For example, if a scene of a frame is not complex, such as when the different partial image fields 320, 330, contain the same object or surface, then the reduced-resolution images 340, 350, can be combined to produce the full rendered frame. If a scene is complex, such as when multiple objects are present in the different partial image fields 320, 330, complex filters can be used for merging the reduced-resolution images 340, 350. The complex filters can be spatial, temporal, or a combination of spatial and temporal filters. For the combination of spatial and temporal filtering, two or more consecutive frames can be rendered, and the results stored and then used for merging. Using FIG. 3A as an example, full frame 310 can be rendered using partial image fields 320 and 330 and resulting reduced-resolution images 340 and 350 that are then stored. The subsequent frame (not shown) can then be rendered using partial image fields with alternate pixels. For example, for the subsequent frame, partial image field 320 can be used with odd pixels and partial image field 330 can be used with even pixels. Reduced-resolution images can then be rendered from these alternate partial image fields and blended with the stored reduced-resolution images 340, 350, to obtain the full frame 310.

Figure 4A:
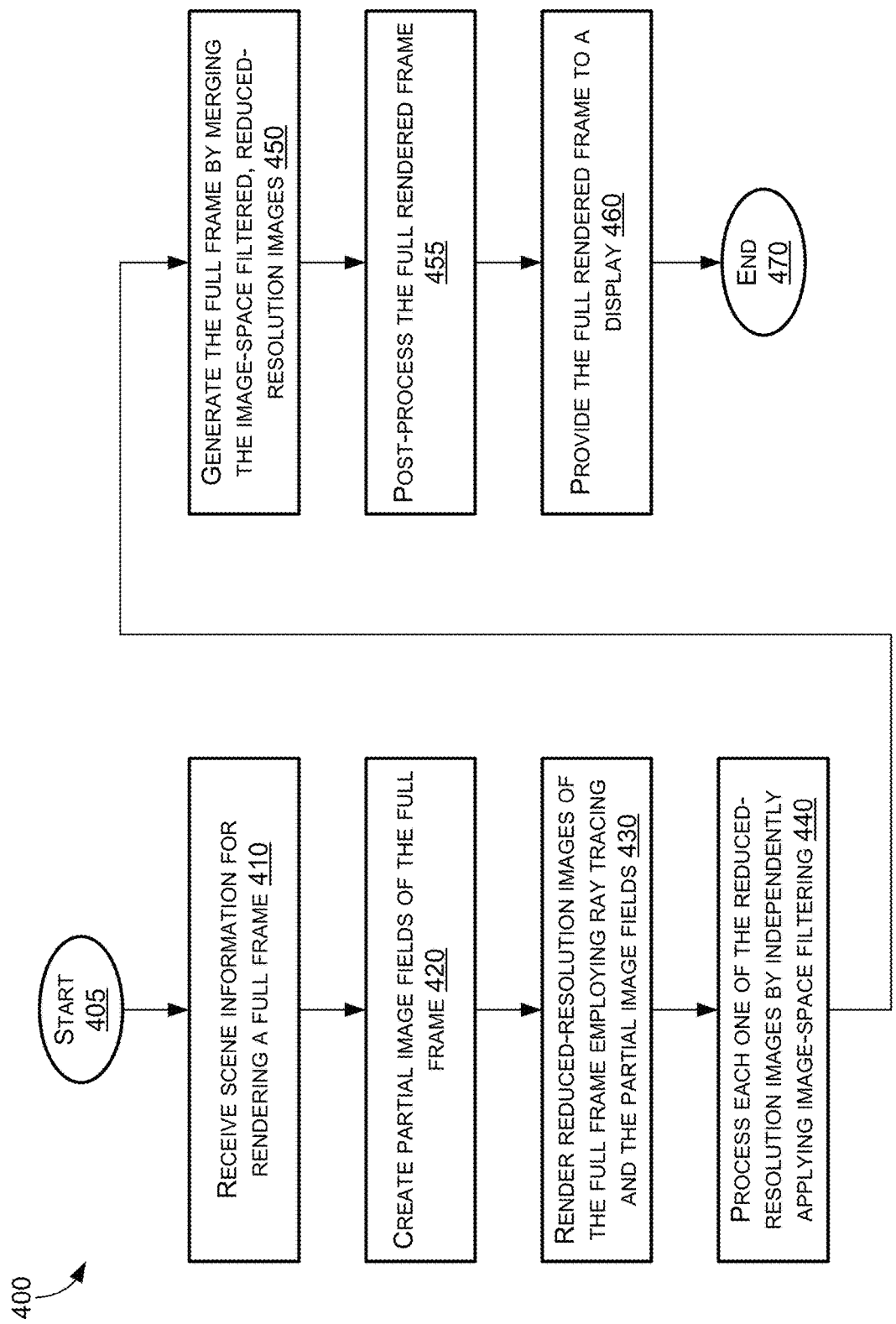
FIG. 4A illustrates a flow diagram of an example of a method of rendering employing ray tracing carried out according to the principles of the disclosure.

Now referring to FIG. 4A, FIG. 4A illustrates a flow diagram of an example of a method 400 of rendering employing ray tracing carried out according to the principles of the disclosure. At least a portion of the render and the graphics processing system of FIGS. 1-2 can be employed for at least some of the operations of the method 400. The method 400 allows processing unique sets of interleaved pixels from a full frame in parallel and then merging the processed results to provide the full rendered frame. The method 400 can be performed by multiple processors or a single processor, such as multiple GPUs or a single GPU. The method 400 is for rendering a single frame and can be repeated for rendering multiple frames. The multiple frames can be combined to create a video stream. The method 400 begins at block 405.

At block 410, scene information for rendering a full frame is received. The scene information can include rendering commands and data that defines scene geometry, lighting, shading, texturing, motion, and/or camera parameters for the frame. The scene information can be received from an application engine, such as application engine 110 of FIG. 1. The application engine can be a game engine.

Partial image fields of the full frame are created at block 420. Each of the partial image fields can include a unique interleaved set of pixels from the pixels of the full frame. The pixels of the different partial image fields can provide an even sampling of the pixels across the full frame. The pixels of each of the unique interleaved pixel sets can be non-adjacent pixels of the full frame. The number of partial image fields can vary and can correspond to a number of processors designated for parallel processing of the different partial image fields.

Figure 5B:
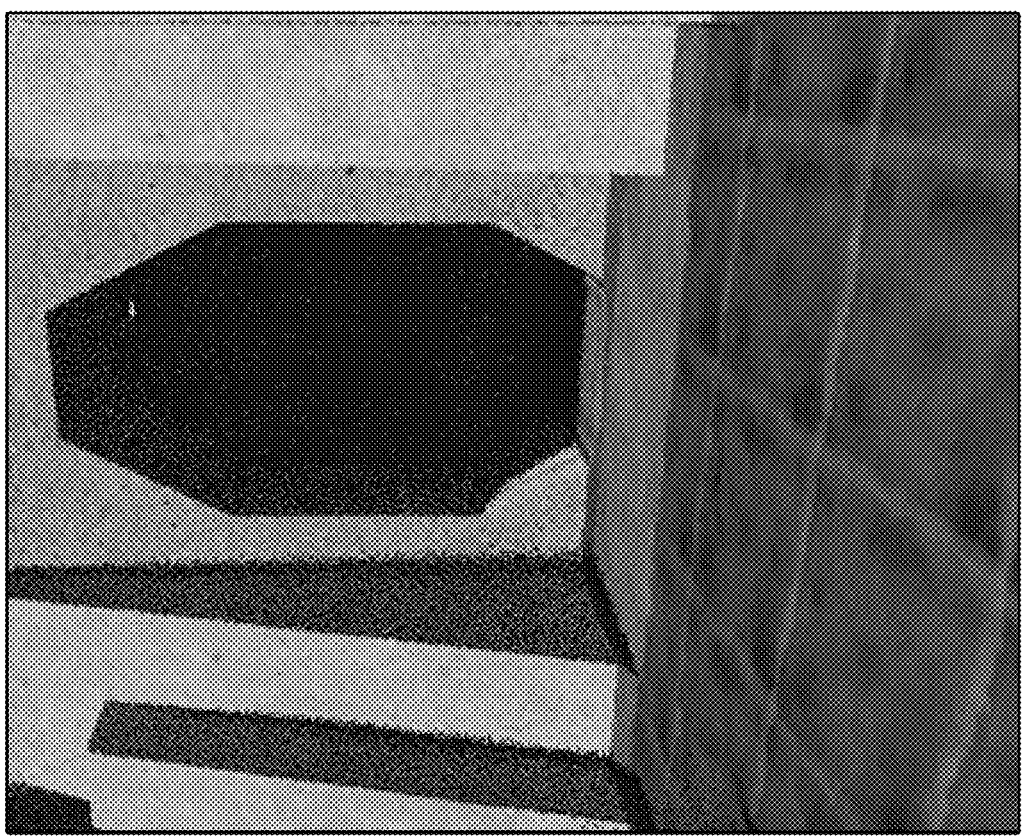
FIG. 5B illustrates an example of a reduced-resolution image, from the same full frame as FIG. 5A, created by a refraction ray.
Figure 5A:
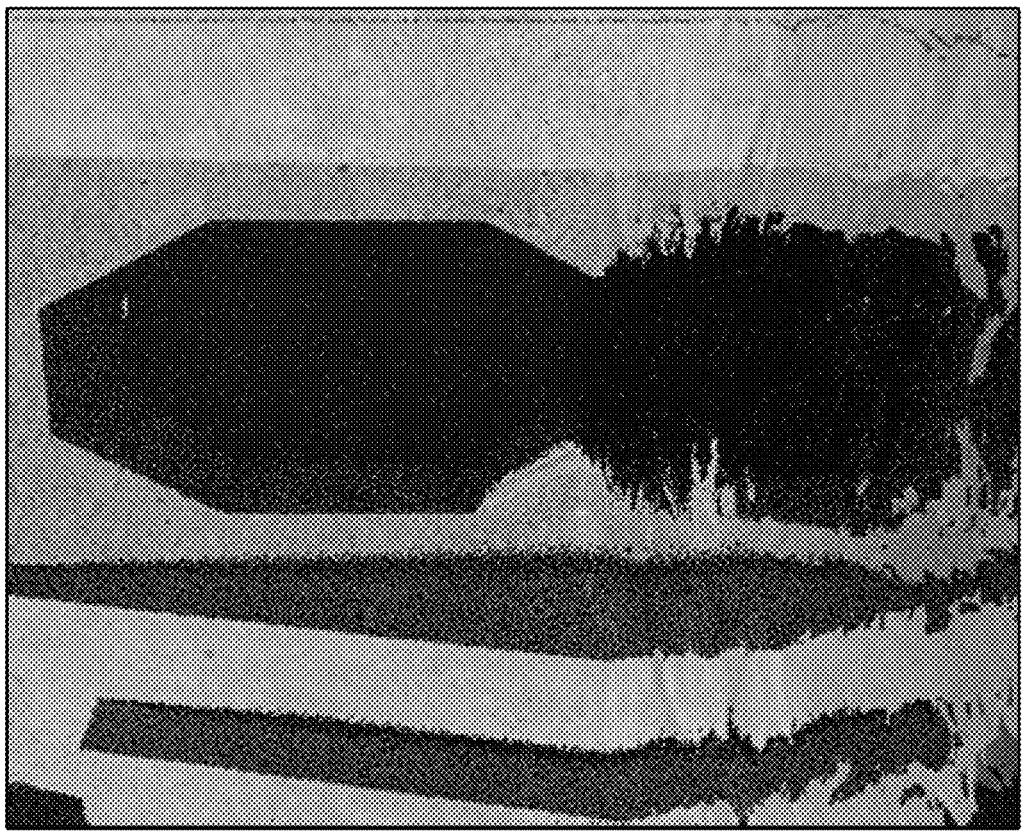
FIG. 5A illustrates an example of a reduced-resolution image created by a reflection ray.

At block 430, reduced-resolution images of the full frame are rendered in parallel by tracing light rays through the different partial image fields. A different light ray can be used for the different partial image fields. For example, a reflection ray can be used for one partial image field and a refraction ray can be used for a second partial image field. FIG. 5A provides an example of a reduced-resolution image created by a reflection ray and FIG. 5B illustrates an example of a reduced-resolution image created by a refraction ray. Both reduced-resolution images are rendered from different partial image fields of the same full frame. For example with respect to FIG. 3A, the reflection reduced-resolution image of FIG. 5A can represent the reduced-resolution image 340 from partial image field 320, and the refraction reduced-resolution image of FIG. 5B can represent the reduced-resolution image 350 from partial image field 330. Both of the images of FIG. 5A and FIG. 5B depict example output that is horizontally compressed and before image-space filtering is applied.

Image-space filtering is applied in parallel to the reduced-resolution images at block 440. The image-space filtering can include, for example, both post-process filtering and denoising operations. When multiple GPUs are employed for the ray tracing, the same GPU that rendered a reduced-resolution image is employed for the image-space filtering thereof. Conventional image-space filters can be employed on the contiguous pixels of the reduced-resolution images.

Figure 6:
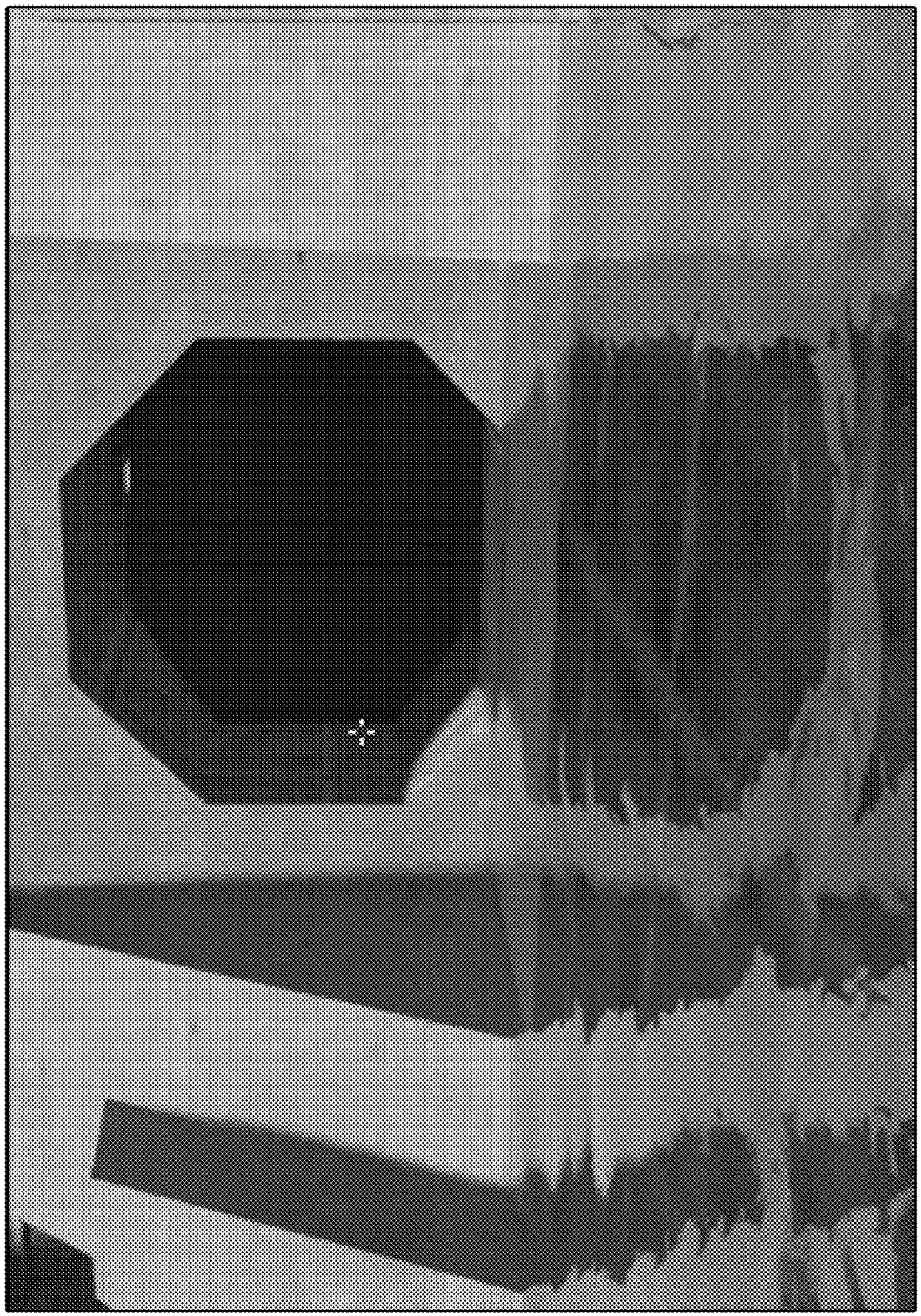
FIG. 6 illustrates an example of the reduced-resolution images of FIG. 5A and FIG. 5B being merged after image-space filtering.
Figure 7:
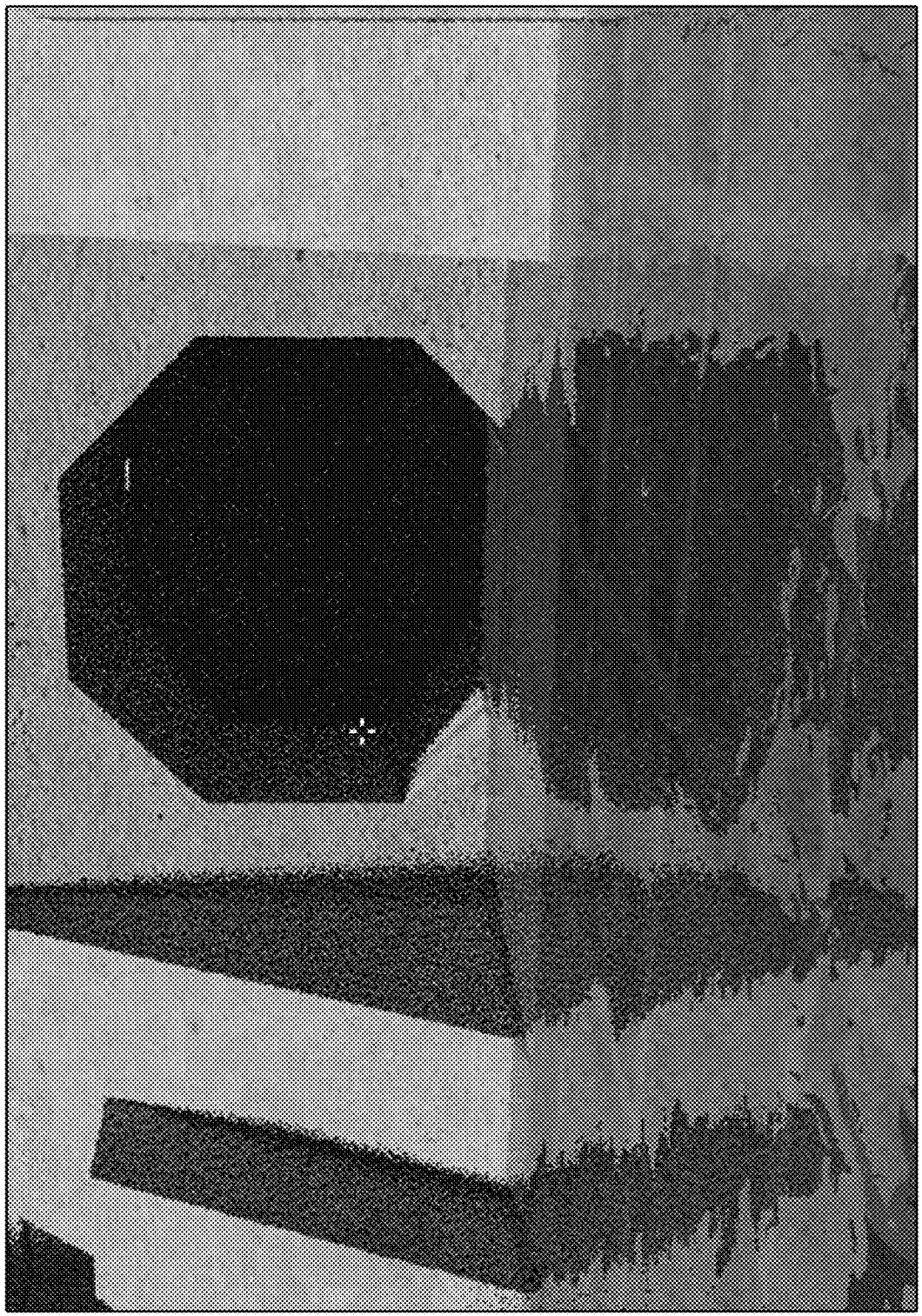
FIG. 7 illustrates the reduced-resolution images of FIG. 5A and FIG. 5B interleaved in a checkerboard pattern without the benefit of parallel image-space filtering disclosed herein.

At block 450, a rendered full frame is provided by merging the image-space filtered, reduced-resolution images. The merging can be performed by interleaving the pixels of the image-space filtered, reduced-resolution images to provide the rendered full frame. Temporal filtering, spatial filtering, or a combination of both temporal and spatial filtering can be employed for the merging. When multiple processors are employed for the rendering and image-space filtering, one of these processors can be designated for performing the merging. For example, a master device of a graphics processing system can be designated to perform the merging. FIG. 6 provides an example of the reduced-resolution images of FIG. 5A and FIG. 5B being merged after image-space filtering where denoiser outputs of the two reduced-resolution images are filtered and interleaved. In contrast, FIG. 7 illustrates the reduced-resolution images of FIG. 5A and FIG. 5B interleaved in a checkerboard pattern without the benefit of the parallel image-space filtering disclosed herein.

Post-processing of the rendered full frame is performed at block 455. For example, one or more post-processing effects can be applied to the full rendered frame, such as high dynamic range (HDR) bloom, anti-aliasing, and tone mapping. A user interface can also be added to the full rendered frame at block 455. One or more the post-processing can be optional.

At block 460, the full rendered frame is provided to a display. The display can be a display of a computer, a smart phone, a computing pad, a game device, or of another type of computing device. The display can be located proximate to or remote from the processor or processors employed to generate the full rendered frame. The full rendered frame can be sent from a cloud-based renderer to the display (or displays) via a communications network. The method 400 ends at block 470.

Figure 4B:
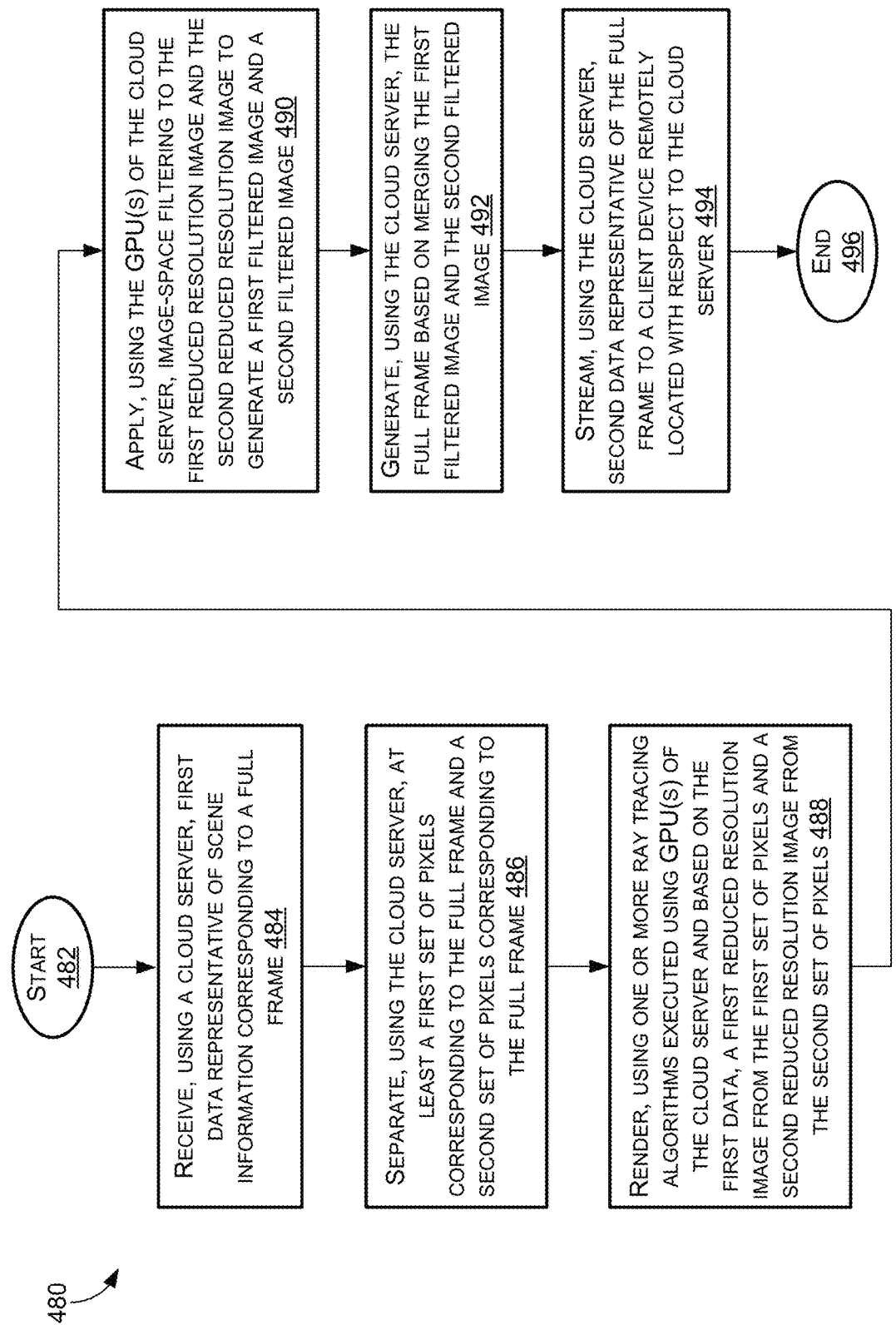
FIG. 4B illustrates a flow diagram of an example of a method of rendering employing ray tracing in a cloud computing environment carried out according to the principles of the disclosure.

Now referring to FIG. 4B, FIG. 4B illustrates a flow diagram of an example of a method 480 of rendering employing ray tracing in a cloud computing environment carried out according to the principles of the disclosure. At least a portion of the render and the graphics processing system of FIGS. 1-2 can be employed for at least some of the operations of the method 480. The method 480 allows processing unique sets of interleaved pixels from a full frame in parallel and then merging the processed results to provide the full rendered frame. The method 480 can be performed by multiple processors or a single processor, such as multiple GPUs or a single GPU. The method 480 is for rendering a single frame and can be repeated for rendering multiple frames. The multiple frames can be combined to create a video stream. The method 480 begins at block 482.

The method 480, at block B484, includes receiving, using a cloud server, first data representative of scene information corresponding to a full frame. For example, a cloud-based server—e.g., executing in a data center—may receive scene information corresponding to a cloud application.

The method 480, at block B486, includes separating, using the cloud server, at least a first set of pixels corresponding to the full frame and a second set of pixels corresponding to the full frame. For example, a first set of pixels may be separated to create the first partial image field 320 and a second set of pixels may be separated to create the second partial image field 330, where the first set of pixels are interleaved with the second set of pixels in the full frame.

The method 480, at block B488, includes rendering, using one or more ray tracing algorithms executed using a graphics processing unit(s) (GPU) of the cloud server and based on the first data, a first reduced resolution image from the first set of pixels and a second reduced resolution image from the second set of pixels. For example, the renderer 120 may render the reduced resolution images 340 and 350. The renderer 120 may render the first reduced resolution image 340 and the second reduced resolution image 350 in parallel—e.g., using a first GPU resource and a second GPU resource. The GPU resources may each correspond to a discrete GPU, a vGPU, or a combination thereof. The rendering may be based on scene information from a scene of the application session (e.g., a scene from a virtual environment of a game application). The scene information may be generated or updated based on inputs to one or more input devices (e.g., keyboard and mouse, controller, VR or AR head mounted display (HMD), etc.) of the client device during the application session.

The method 480, at block B490, includes applying, using the GPU(s) of the cloud server, image-space filtering to the first reduced resolution image and the second reduced resolution image to generate a first filtered image and a second filtered image. For example, one or more post-process filters or denoising operations may be executed to generate filtered images (e.g., updated versions of the reduced resolution images having updated pixel values based on the image-space filtering). Although described as using a GPU(s), this is not intended to be limiting, and other processing unit types may be used (e.g., CPUs).

The method 480, at block B492, includes generating, using the cloud server, the full frame based at least in part on merging the first filtered image and the second filtered image. For example, a full frame may be generated by merging the filtered images together.

The method 480, at block B494, includes streaming, using the cloud server, second data representative of the full frame to a client device remotely located with respect to the cloud server. For example, the cloud server may transmit a stream of frames to the client device during executing of the cloud application, and the full frame may correspond to one frame of the stream of frames. In some embodiments, stream of frames may be transmitted at 30 frames per second (fps), 60 fps, or greater. The method 480 ends at block B496.

Example Game Streaming System

Figure 8:
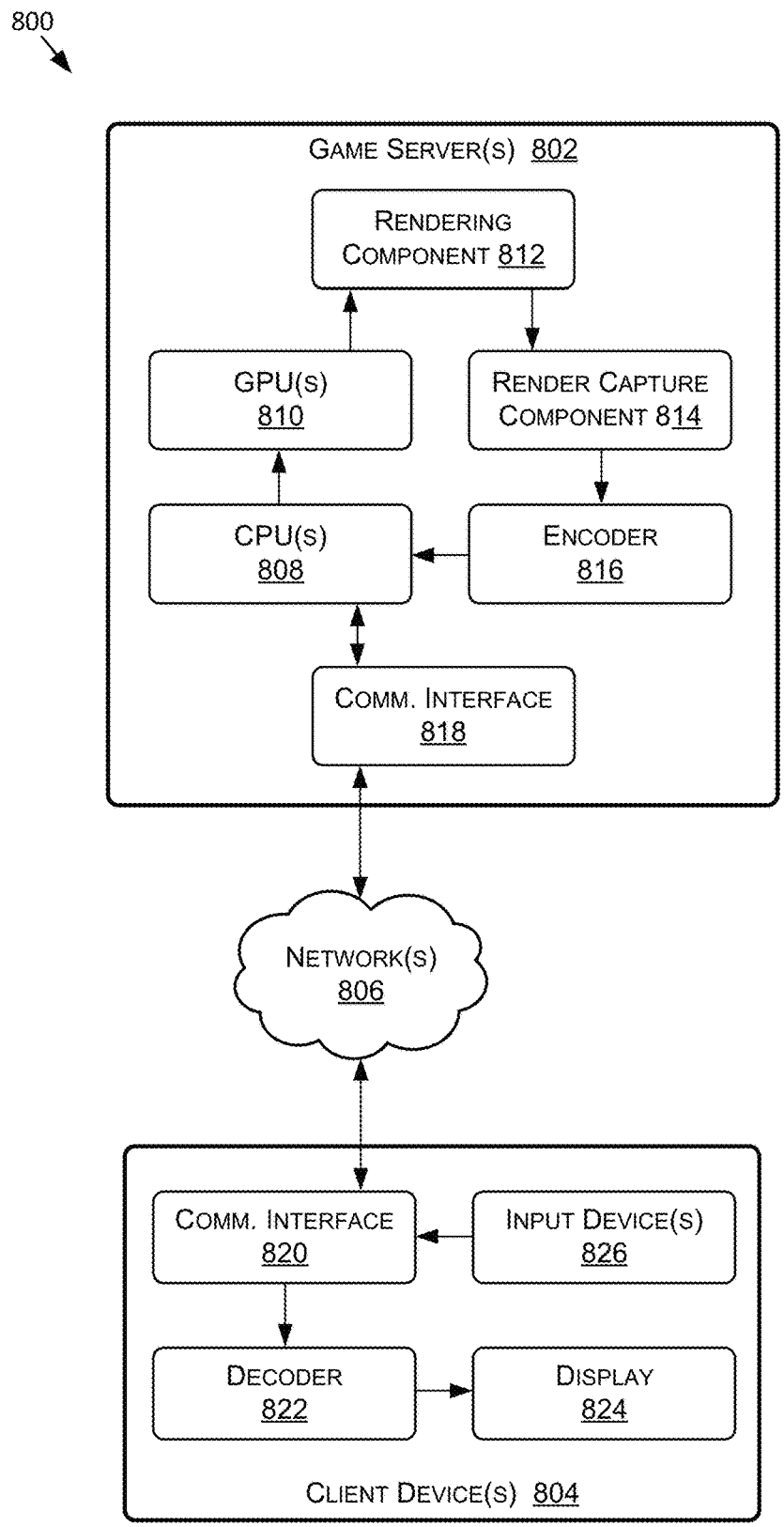
FIG. 8 is a block diagram of an example game streaming system suitable for use in implementing some embodiments of the present disclosure.

Now referring to FIG. 8, FIG. 8 is an example system diagram for a game streaming system 800, in accordance with some embodiments of the present disclosure. FIG. 8 includes game server(s) 802 (which may include similar components, features, and/or functionality to the example computing device 900 of FIG. 9), client device(s) 804

Figure 9:
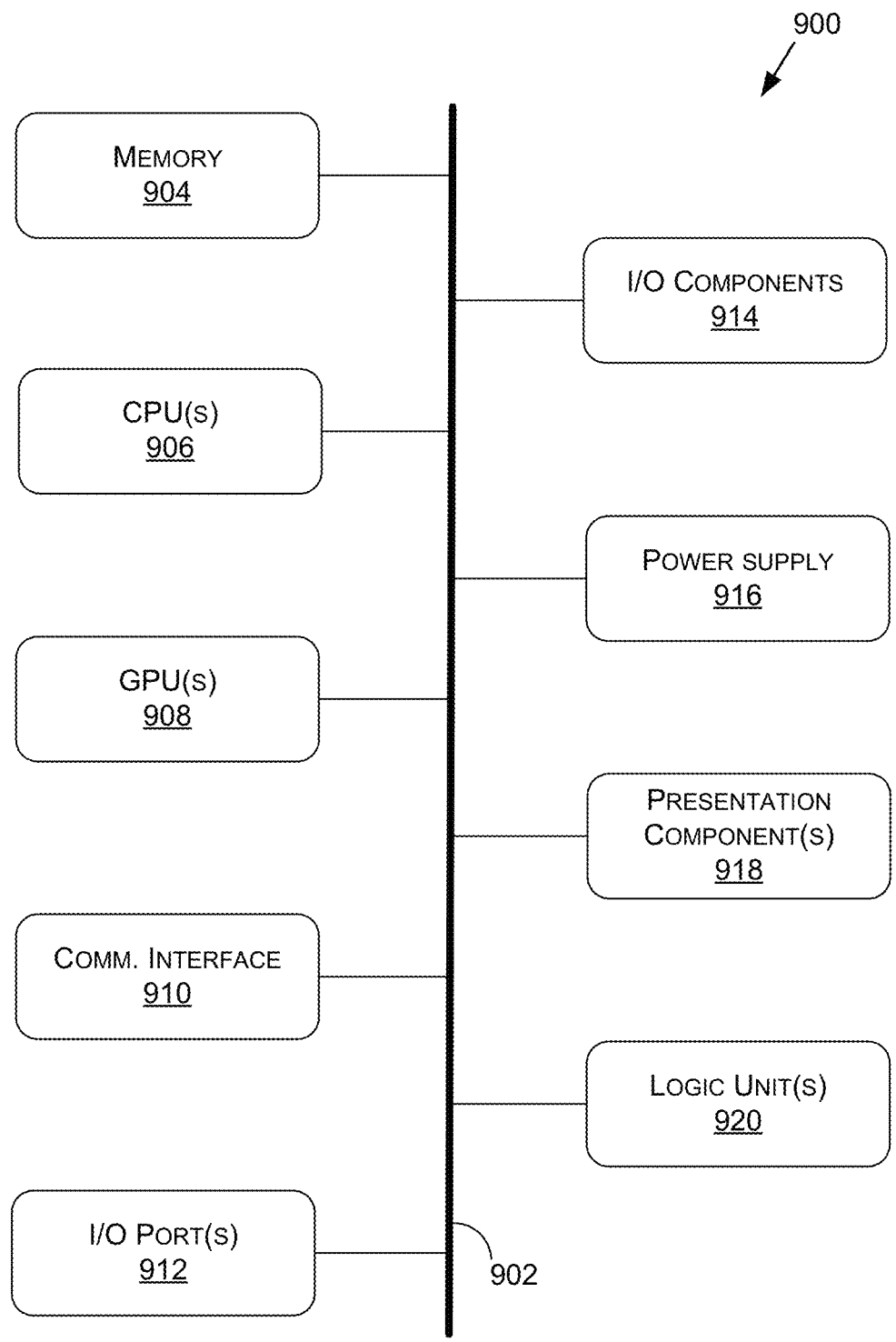
FIG. 9 is a block diagram of an example computing device suitable for use in implementing some embodiments of the present disclosure.

(which may include similar components, features, and/or functionality to the example computing device 900 of FIG. 9), and network(s) 806 (which may be similar to the network(s) described herein). In some embodiments of the present disclosure, the system 800 may be implemented. For example, the computing system 100 may be executed using at least some of the components, features, and/or functionality of the system 800.

In the system 800, for a game session, the client device(s) 804 may only receive input data in response to inputs to the input device(s), transmit the input data to the game server(s) 802, receive encoded display data from the game server(s) 802, and display the display data on the display 824. As such, the more computationally intense computing and processing is offloaded to the game server(s) 802 (e.g., rendering—in particular ray or path tracing according to the techniques described herein, for example—for graphical output of the game session is executed by the GPU(s) of the game server(s) 802). In other words, the game session is streamed to the client device(s) 804 from the game server(s) 802, thereby reducing the requirements of the client device(s) 804 for graphics processing and rendering.

For example, with respect to an instantiation of a game session, a client device 804 may be displaying a frame of the game session on the display 824 based on receiving the display data from the game server(s) 802. The client device 804 may receive an input to one of the input device(s) and generate input data in response. The client device 804 may transmit the input data to the game server(s) 802 via the communication interface 820 and over the network(s) 806 (e.g., the Internet), and the game server(s) 802 may receive the input data via the communication interface 818. The CPU(s) may receive the input data, process the input data (e.g., by updating scene information corresponding to the virtual environment of the game session), and transmit data to the GPU(s) that causes the GPU(s) to generate a rendering of the game session. For example, the input data may be representative of a movement of a character of the user in a game, firing a weapon, reloading, passing a ball, turning a vehicle, etc. The rendering component 812 may render the game session (e.g., representative of the result of the input data) and the render capture component 814 may capture the rendering of the game session as display data (e.g., as image data capturing the rendered frame of the game session). The rendering of the game session may include ray or path traced lighting and/or shadow effects, computed using one or more parallel processing units—such as GPUs, which may further employ the use of one or more dedicated hardware accelerators or processing cores to perform ray or path tracing techniques—of the game server(s) 802. The encoder 816 may then encode the display data to generate encoded display data and the encoded display data may be transmitted to the client device 804 over the network(s) 806 via the communication interface 818. The client device 804 may receive the encoded display data via the communication interface 820 and the decoder 822 may decode the encoded display data to generate the display data. The client device 804 may then display the display data via the display 824.

Example Computing Device

FIG. 9 is a block diagram of an example computing device(s) 900 suitable for use in implementing some embodiments of the present disclosure. Computing device 900 may include an interconnect system 902 that directly or indirectly couples the following devices: memory 904, one or more central processing units (CPUs) 906, one or more graphics processing units (GPUs) 908, a communication interface 910, input/output (I/O) ports 912, input/output components 914, a power supply 916, one or more presentation components 918 (e.g., display(s)), and one or more logic units 920.

Although the various blocks of FIG. 9 are shown as connected via the interconnect system 902 with lines, this is not intended to be limiting and is for clarity only. For example, in some embodiments, a presentation component 918, such as a display device, may be considered an I/O component 914 (e.g., if the display is a touch screen). As another example, the CPUs 906 and/or GPUs 908 may include memory (e.g., the memory 904 may be representative of a storage device in addition to the memory of the GPUs 908, the CPUs 906, and/or other components). In other words, the computing device of FIG. 9 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 9.

The interconnect system 902 may represent one or more links or busses, such as an address bus, a data bus, a control bus, or a combination thereof. The interconnect system 902 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 906 may be directly connected to the memory 904. Further, the CPU 906 may be directly connected to the GPU 908. Where there is direct, or point-to-point connection between components, the interconnect system 902 may include a PCIe link to carry out the connection. In these examples, a PCI bus need not be included in the computing device 900.

The memory 904 may include any of a variety of computer-readable media. The computer-readable media may be any available media that may be accessed by the computing device 900. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 904 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 900. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

Portions of disclosed embodiments may relate to computer storage products with a non-transitory computer-readable medium that have program code thereon for performing various computer-implemented operations that embody a part of an apparatus, device or carry out the steps of a method set forth herein. Non-transitory used herein refers to all computer-readable media except for transitory, propagating signals. Examples of non-transitory computer-readable media include, but are not limited to: magnetic media such as hard disks, floppy disks, and magnetic tape; optical media such as CD-ROM disks; magneto-optical media such as floptical disks; and hardware devices that are specially configured to store and execute program code, such as ROM and RAM devices. Examples of program code include both machine code, such as produced by a compiler, and files containing higher level code that may be executed by the computer using an interpreter.

The CPU(s) 906 may be configured to execute at least some of the computer-readable instructions to control one or more components of the computing device 900 to perform one or more of the methods and/or processes described herein. The CPU(s) 906 may each include one or more cores (e.g., one, two, four, eight, twenty-eight, seventy-two, etc.) that are capable of handling a multitude of software threads simultaneously. The CPU(s) 906 may include any type of processor, and may include different types of processors depending on the type of computing device 900 implemented (e.g., processors with fewer cores for mobile devices and processors with more cores for servers). For example, depending on the type of computing device 900, the processor may be an Advanced RISC Machines (ARM) processor implemented using Reduced Instruction Set Computing (RISC) or an x86 processor implemented using Complex Instruction Set Computing (CISC). The computing device 900 may include one or more CPUs 906 in addition to one or more microprocessors or supplementary co-processors, such as math co-processors.

In addition to or alternatively from the CPU(s) 906, the GPU(s) 908 may be configured to execute at least some of the computer-readable instructions to control one or more components of the computing device 900 to perform one or more of the methods and/or processes described herein. One or more of the GPU(s) 908 may be an integrated GPU (e.g., with one or more of the CPU(s) 906 and/or one or more of the GPU(s) 908 may be a discrete GPU. In embodiments, one or more of the GPU(s) 908 may be a coprocessor of one or more of the CPU(s) 906. The GPU(s) 908 may be used by the computing device 900 to render graphics (e.g., 3D graphics) or perform general purpose computations. For example, the GPU(s) 908 may be used for General-Purpose computing on GPUs (GPGPU). The GPU(s) 908 may include hundreds or thousands of cores that are capable of handling hundreds or thousands of software threads simultaneously. The GPU(s) 908 may generate pixel data for output images in response to rendering commands (e.g., rendering commands from the CPU(s) 906 received via a host interface). The GPU(s) 908 may include graphics memory, such as display memory, for storing pixel data or any other suitable data, such as GPGPU data. The display memory may be included as part of the memory 904. The GPU(s) 908 may include two or more GPUs operating in parallel (e.g., via a link). The link may directly connect the GPUs (e.g., using NVLINK) or may connect the GPUs through a switch (e.g., using NVSwitch). When combined together, each GPU 908 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 906 and/or the GPU(s) 908, the logic unit(s) 920 may be configured to execute at least some of the computer-readable instructions to control one or more components of the computing device 900 to perform one or more of the methods and/or processes described herein. In embodiments, the CPU(s) 906, the GPU(s) 908, and/or the logic unit(s) 920 may discretely or jointly perform any combination of the methods, processes and/or portions thereof. One or more of the logic units 920 may be part of and/or integrated in one or more of the CPU(s) 906 and/or the GPU(s) 908 and/or one or more of the logic units 920 may be discrete components or otherwise external to the CPU(s) 906 and/or the GPU(s) 908. In embodiments, one or more of the logic units 920 may be a coprocessor of one or more of the CPU(s) 906 and/or one or more of the GPU(s) 908.

Examples of the logic unit(s) 920 include one or more processing cores and/or components thereof, such as Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

A portion of the above-described apparatus, systems or methods may be embodied in or performed by various digital data processors or computers, wherein the computers are programmed or store executable programs of sequences of software instructions to perform one or more of the steps of the methods. The software instructions of such programs may represent algorithms and be encoded in machine-executable form on non-transitory digital data storage media, e.g., magnetic or optical disks, random-access memory (RAM), magnetic hard disks, flash memories, and/or read-only memory (ROM), to enable various types of digital data processors or computers to perform one, multiple or all of the steps of one or more of the above-described methods, or functions, systems or apparatuses described herein.

The digital data processors or computers can be comprised of one or more GPUs, one or more CPUs, one or more of other processor types, or a combination thereof. The digital data processors and computers can be located proximate each other, proximate a user, in a cloud environment, a data center, or located in a combination thereof. For example, some components can be located proximate the user and some components can be located in a cloud environment or data center.

The GPUs can be embodied on a single semiconductor substrate, included in a system with one or more other devices such as additional GPUs, a memory, and a CPU. The GPUs may be included on a graphics card that includes one or more memory devices and is configured to interface with a motherboard of a computer. The GPUs may be integrated GPUs (iGPUs) that are co-located with a CPU on a single chip. The processors or computers can be part of GPU racks located in a data center. The GPU racks can be high-density (HD) GPU racks that include high performance GPU compute nodes and storage nodes.

The communication interface 910 may include one or more receivers, transmitters, and/or transceivers that enable the computing device 900 to communicate with other computing devices via an electronic communication network, included wired and/or wireless communications. The communication interface 910 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet.

The I/O ports 912 may enable the computing device 900 to be logically coupled to other devices including the I/O components 914, the presentation component(s) 918, and/or other components, some of which may be built in to (e.g., integrated in) the computing device 900. Illustrative I/O components 914 include a microphone, mouse, keyboard, joystick, game pad, game controller, satellite dish, scanner, printer, wireless device, etc. The I/O components 914 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 900. The computing device 900 may be include depth cameras, such as stereoscopic camera systems, infrared camera systems, RGB camera systems, touchscreen technology, and combinations of these, for gesture detection and recognition. Additionally, the computing device 900 may include accelerometers or gyroscopes (e.g., as part of an inertia measurement unit (IMU)) that enable detection of motion. In some examples, the output of the accelerometers or gyroscopes may be used by the computing device 900 to render immersive augmented reality or virtual reality.

The power supply 916 may include a hard-wired power supply, a battery power supply, or a combination thereof. The power supply 916 may provide power to the computing device 900 to enable the components of the computing device 900 to operate. The presentation component(s) 918 may include a display (e.g., a monitor, a touch screen, a television screen, a heads-up-display (HUD), other display types, or a combination thereof), speakers, and/or other presentation components. The presentation component(s) 918 may receive data from other components (e.g., the GPU(s) 908, the CPU(s) 906, etc.), and output the data (e.g., as an image, video, sound, etc.).

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 900 of FIG. 9—e.g., each device may include similar components, features, and/or functionality of the computing device(s) 900.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 900 described herein with respect to FIG. 9. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

In interpreting the disclosure, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

Those skilled in the art to which this application relates will appreciate that other and further additions, deletions, substitutions and modifications may be made to the described embodiments. It is also to be understood that the terminology used herein is for the purpose of describing particular embodiments only, and is not intended to be limiting, since the scope of the present disclosure will be limited only by the claims. Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, a limited number of the exemplary methods and materials are described herein.

It is noted that as used herein and in the appended claims, the singular forms "a", "an", and "the" include plural referents unless the context clearly dictates otherwise.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A system comprising:
   one or more cloud-based servers including one or more graphics processing unit (GPU) resources, the one or more GPU resources comprising processing circuitry to:
   generate, using one or more reflection rays corresponding to an application of one or more light transport simulation algorithms, and based at least on a first image field corresponding to a first subset of interleaved pixels of a full frame from a virtual scene, a first reduced resolution image corresponding to the first subset of interleaved pixels of the full frame;
   generate, using the one or more refraction rays corresponding to the application of one or more light transport simulation algorithms, and based at least on a second image field corresponding to a second subset of interleaved pixels from the full frame, a second reduced resolution image corresponding to the second subset of interleaved pixels of the full frame; and
   reconstruct the full frame based at least on the first reduced resolution image and the second reduced resolution image.

2. The system of claim 1, wherein the generation of the first reduced resolution image includes using a first GPU resource of the one or more GPU resources and the generation of the second reduced resolution image includes using a second GPU resource of the one or more GPU resources.

3. The system of claim 1, wherein
   the generation of the first reduced resolution image is executed in parallel with the generation of the second reduced resolution image.

4. The system of claim 1, wherein the one or more light transport simulation algorithms include at least one of a ray-tracing algorithm or a path-tracing algorithm.

5. The system of claim 1, wherein the full frame is further reconstructed using one or more image-space filters, the one or more image-space filters including at least one of a denoising operation, a spatial filter, or a neighborhood filter.

6. The system of claim 1, wherein the first subset of interleaved pixels includes every other pixel in at least three rows of pixels of the full frame starting with a first pixel, and the second subset of interleaved pixels includes every other pixel in the at least three rows of pixels of the full frame starting with a second pixel after the first pixel.

7. The system of claim 1, wherein the first subset of interleaved pixels includes every other pixel in at least three columns of pixels of the full frame starting with a first pixel, and the second subset of interleaved pixels includes every other pixel in the at least three columns of pixels of the full frame starting with a second pixel after the first pixel.

8. The system of claim 1, wherein the processing circuitry is further to encode the full frame to generate an encoded frame, and transmit the encoded frame to one or more end-user devices.

9. The system of claim 1, wherein the system is comprised in at least one of:
- a cloud-based system;
- a system for cloud video game streaming;
- a system for hosting one or more cloud virtual reality (VR) applications;
- a system for executing one or more simulation applications; or
- a system for hosting one or more remote desktop applications.

10. A processor comprising:
processing circuitry to:
generate, using one or more reflection rays corresponding to an application of one or more light transport simulation algorithms, and based at least on a first image field corresponding to a first subset of interleaved pixels of a full frame from a virtual scene, a first reduced resolution image corresponding to the first subset of interleaved pixels of the full frame;
generate, using one or more refraction rays corresponding to the application of one or more light transport simulation algorithms, and based at least on a second image field corresponding to a second subset of interleaved pixels from the full frame, a second reduced resolution image corresponding to the second subset of interleaved pixels of the full frame; and
generate, based at least on the first reduced resolution image and the second reduced resolution image, the full frame.

11. The processor of claim 10, wherein the generation of the first reduced resolution image includes using a first GPU resource of the processor and the generation of the second reduced resolution image includes using a second GPU resource of the processor.

12. The processor of claim 10, wherein at least one of:
the generation of the first reduced resolution image is executed in parallel with the generation of the second reduced resolution image.

13. The processor of claim 10, wherein the one or more light transport simulation algorithms include at least one of a ray-tracing algorithm or a path-tracing algorithm.

14. The processor of claim 10, wherein the generation of the full frame further uses one or more image-space filters, the one or more image-space filters including at least one of a denoising operation, a spatial filter, or a neighborhood filter.

15. The processor of claim 10, wherein at least one of:
the first subset of interleaved pixels includes every other pixel in at least three rows of pixels of the full frame starting with a first pixel, and the second subset of interleaved pixels includes every other pixel in the at least throw rows of pixels of the full frame starting with a second pixel after the first pixel; or
the first subset of interleaved pixels includes every other pixel in at least three columns of pixels of the full frame starting with a first pixel, and the second subset of interleaved pixels includes every other pixel in the at least throw columns of pixels of the full frame starting with a second pixel after the first pixel.

16. The processor of claim 10, wherein the processing circuitry is further to encode the full frame to generate an encoded frame, and transmit the encoded frame to one or more end-user devices.

17. The processor of claim 10, wherein the processor is comprised in a cloud-based server.

18. The processor of claim 10, wherein the processor is comprised in at least one of:
- a cloud-based system;
- a system for cloud video game streaming;
- a system for hosting one or more cloud virtual reality (VR) applications;
- a system for executing one or more simulation applications; or
- a system for hosting one or more remote desktop applications.

19. A method comprising:
generating, using one or more reflection rays corresponding to an application of one or more light transport simulation algorithms, and based at least on a first image field corresponding to a first subset of interleaved pixels of a full frame from a virtual scene, a first reduced resolution image corresponding to the first subset of interleaved pixels of the full frame;
generating, using one or more refraction rays corresponding to the application of one or more light transport simulation algorithms, and based at least on a second image field corresponding to a second subset of interleaved pixels from the full frame, a second reduced resolution image corresponding to the second subset of interleaved pixels of the full frame; and
generating the full frame based at least on the first reduced resolution image and the second reduced resolution image.

20. The method of claim 19, further comprising generating, based at least on the full frame, the first image field corresponding to the first subset of interleaved pixels and the second image field corresponding to the second subset of interleaved pixels.

* * * * *